US008832158B2

(12) United States Patent
Diner et al.

(10) Patent No.: US 8,832,158 B2
(45) Date of Patent: Sep. 9, 2014

(54) FAST PREDICATE TABLE SCANS USING SINGLE INSTRUCTION, MULTIPLE DATA ARCHITECTURE

(75) Inventors: Eduard Diner, Stuttgart (DE); Jens Leenstra, Bondorf (DE); Vijayshankar Raman, Sunnyvale, CA (US); Adam J. Storm, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 69 days.

(21) Appl. No.: 13/433,507

(22) Filed: Mar. 29, 2012

(65) Prior Publication Data

US 2013/0262519 A1    Oct. 3, 2013

(51) Int. Cl.
*G06F 17/30* (2006.01)

(52) U.S. Cl.
USPC ............................ 707/802; 707/602; 707/714

(58) Field of Classification Search
CPC ................ G06F 17/30519; G06F 17/30286
USPC .................................. 707/802, 750, 602, 714
See application file for complete search history.

(56) References Cited

U.S. PATENT DOCUMENTS

| 5,138,670 | A  | * | 8/1992  | Nakajima et al. ............. 382/282 |
| 5,819,259 | A  | * | 10/1998 | Duke-Moran et al. ................. 1/1 |
| 6,496,834 | B1 | * | 12/2002 | Cereghini et al. ............. 707/737 |
| 6,772,163 | B1 | * | 8/2004  | Sinclair et al. ........................ 1/1 |
| 6,999,967 | B1 | * | 2/2006  | Ghazal et al. ......................... 1/1 |
| 7,080,072 | B1 | * | 7/2006  | Sinclair ................................... 1/1 |
| 7,113,957 | B1 |   | 9/2006  | Cohen et al. |
| 7,383,262 | B2 |   | 6/2008  | Das et al. |
| 7,840,554 | B2 |   | 11/2010 | Johnson et al. ............... 707/714 |
| 8,296,271 | B1 | * | 10/2012 | Richardson et al. .......... 707/674 |
| 8,587,817 | B2 | * | 11/2013 | Wakiyama et al. .......... 358/1.16 |
| 2005/0289102 | A1 | * | 12/2005 | Das et al. ........................... 707/1 |
| 2006/0082612 | A1 | * | 4/2006  | Morikawa et al. .............. 347/37 |
| 2006/0167865 | A1 | * | 7/2006  | Andrei ............................... 707/4 |
| 2011/0113125 | A1 |   | 5/2011  | Bruna et al. .................. 709/220 |
| 2011/0208754 | A1 | * | 8/2011  | Li et al. ......................... 707/750 |
| 2012/0016901 | A1 | * | 1/2012  | Agarwal et al. ............... 707/769 |
| 2012/0197868 | A1 | * | 8/2012  | Fauser et al. .................. 707/714 |

OTHER PUBLICATIONS

Willhalm et al., "SIMD-Scan: Ultra Fast in-Memory Table Scan using on-Chip Vector Processing Units," Proceedings of the VLDB Endowment, VLDB Endowment Inc., vol. 2, issue 1, Aug. 2009, 10 pages.
Johnson et al., "Row-wise Parallel Predicate Evaluation," Proceedings of the VLDB Endowment, VLDB Endowment Inc., vol. 1, issue 1, Aug. 2008, 13 pages.
Stolze et al., "Bringing BLINK Closer to the Full Power of SQL," Proceedings of BTW 2009, Mar. 2009, pp. 157-166.

(Continued)

*Primary Examiner* — Jean M Corrielus
(74) *Attorney, Agent, or Firm* — VanLeeuwen & VanLeeuwen; Matthew W. Baca

(57) ABSTRACT

An approach is provided in which a processor receives a scan request to scan data included in a data table. The processor selects a column in the data table corresponding to the scan request and retrieves column data entries from the selected column. In addition, the processor identifies the width of the selected column and selects a scan algorithm based upon the identified column width. In turn, the processor loads the column data entries into column data vectors and computes scan results from the column data vectors using the selected scan algorithm.

13 Claims, 10 Drawing Sheets

(56) References Cited

OTHER PUBLICATIONS

Haas et al., "Discovering and Exploiting Statistical Properties for Query Optimization in Relational Databases: A Survey," Statistical Analysis and Data Mining, vol. 1, Issue 4, Mar. 2009, pp. 223-250.
Dash et al., "Dynamic Faceted Search for Discovery-driven Analysis," CIKM '08, Proceedings of the 17$^{th}$ ACM conference on Information and knowledge management, Oct. 2008, 10 pages.
Han et al., "Parallelizing Query Optimization," Proceedings of the VLDB Endowment, VLDB Endowment Inc., vol. 1, issue 1, Aug. 2008, pp. 188-200.
Raman et al., "Constant-Time Query Processing," 2008 IEEE 24$^{th}$ International Conference on Data Engineering, Apr. 2008, pp. 60-69.
Abadi et al., "Column-oriented Database Systems," Proceedings of the VLDB Endowment, VLDB Endowment Inc., vol. 2, issue 1, Aug. 2009, 2 pages.
"IBM Smart Analytics Optimizer for DB2 for z/OS enables a new class of business intelligence and data warehousing workloads for the IBM System z platform," IBM United States Software Announcement, International Business Machines Corporation, Jul. 2010, 16 pages.
Draese, "IBM Smart Analytics Optimizer Architecture and Overview," Presentation Slides, Information on Demand 2009, International Business Machines Corporation, Oct. 2009, 44 pages.
Notice of Allowance for U.S. Appl. No. 13/746,146, United States Patent and Trademark Office, mailed May 14, 2014, 11 pages.

* cited by examiner

Scan Algorithm Selection Table
(LB<=COL<=UB, UB>=LB)
(# Instructions Included in Algorithm)

| Column Width | Bankwidth= 1, 2, 4 No SIMD Element Crossings | | Bankwidth= 2 (128b) SIMD Element Crossings | | Bankwidth= 4 (256b) SIMD Element Crossings | |
|---|---|---|---|---|---|---|
| | Equality Scan | Range Scan | Equality Scan | Range Scan | Equality Scan | Range Scan |
| 1 bit | A (1) | PASS | N/A | N/A | N/A | N/A |
| 8, 16, 32, 64 bit | B (1) | C (3) | N/A | N/A | N/A | N/A |
| 2, 4 bit | D (4) | E (7) | N/A | N/A | N/A | N/A |
| Others 3, 5, 7, ... | N/A | N/A | H (7) | I (15) | L (8) | M (17) |

FIG. 4

FAST PREDICATE TABLE SCANS USING SINGLE INSTRUCTION, MULTIPLE DATA ARCHITECTURE

BACKGROUND

The present disclosure relates to selecting a scan algorithm based upon a column width of column data entries and using the selected scan algorithm to generate scan results from the column data entries.

A data warehouse accelerator may perform a table scan over large amounts of compressed data that represents denormalized tuples from a relational database system. The table scans may include equality scans (e.g. scan for a particular value) or a range scan (e.g., scan for values between a lower bound and an upper bound). During table scans, the data warehouse accelerator may fetch a small subset of the table at a time since data warehouse tables typically include a large amount of columns with varying column widths.

BRIEF SUMMARY

According to one embodiment of the present disclosure, an approach is provided in which a processor receives a scan request to scan data included in a data table. The processor selects a column in the data table corresponding to the scan request and retrieves column data entries from the selected column. In addition, the processor identifies the width of the selected column and selects a scan algorithm based upon the identified column width. In turn, the processor loads the column data entries into column data vectors and computes scan results from the column data vectors using the selected scan algorithm.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 4 is an exemplary scan algorithm selection table that includes the number of instructions for each of the different scan algorithms;

DETAILED DESCRIPTION

Figure 1:
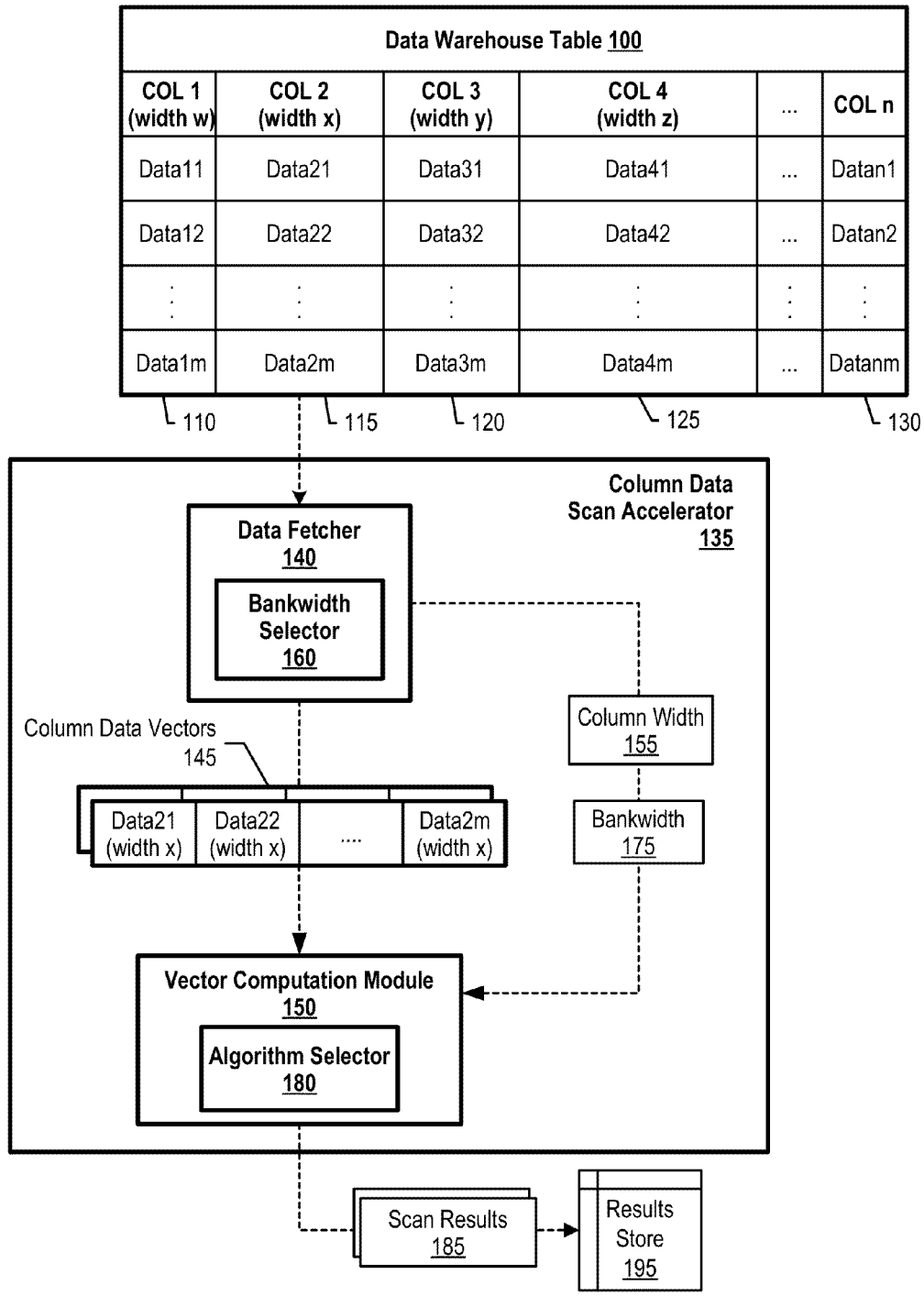
FIG. 1 is a diagram showing a column data scan accelerator selecting and utilizing a scan algorithm based upon the column width of a column and a bankwidth size of a column data vector.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

FIG. 1 is a diagram showing a Rational Database Management System (RDBMS) storing its data in columnar fashion and utilizing a scan algorithm based upon the column width of a column and a bankwidth size of a column data vector.

Data warehouse table 100 includes columns 110-130. Each of columns 110-130 has a particular column width, such as 1-bit, 4-bit, 8-bit, 9-bit, etc. Column data scan accelerator 135 receives and processes statistical scan requests that correspond to data included in one of the columns included in data warehouse table 100. For example, column 120 may include the age of members in a group and column data scan accelerator 130 may receive a range scan request to identify the amount of users between ages 35-45.

When column data scan accelerator 135 receives a request, data fetcher 140 identifies one of columns 110-130 that corresponds to the request and fetches the column data entries included in the identified column. The example shown in FIG. 1 shows that data fetcher 140 selected column 115 to fetch the column data entries. Data fetcher 140 identifies the column width of the selected column and utilizes bankwidth selector 160 to select a "bankwidth size." The bankwidth size is the size of column data vectors into which data fetcher loads the column data packets. In one embodiment, the bankwidth size may be selected from sizes of 64 bits, 128 bits, or 256 bits (see FIGS. 2A-2C and corresponding text for further details).

Data fetcher 140 loads the column data entries into column data vectors 145 and passes them to vector computation module 150. Data fetcher 140 also provides column width 155 and bankwidth size 175 to vector computation module. As such, scan algorithm selector 180 selects a particular scan algorithm to utilize on column data vectors 145 based upon column width 155 and bankwidth size 175. In one embodiment, scan algorithm selector 180 utilizes a look-up table to determine which scan algorithm to utilize (see FIG. 4 and corresponding text for further details).

Figure 5:
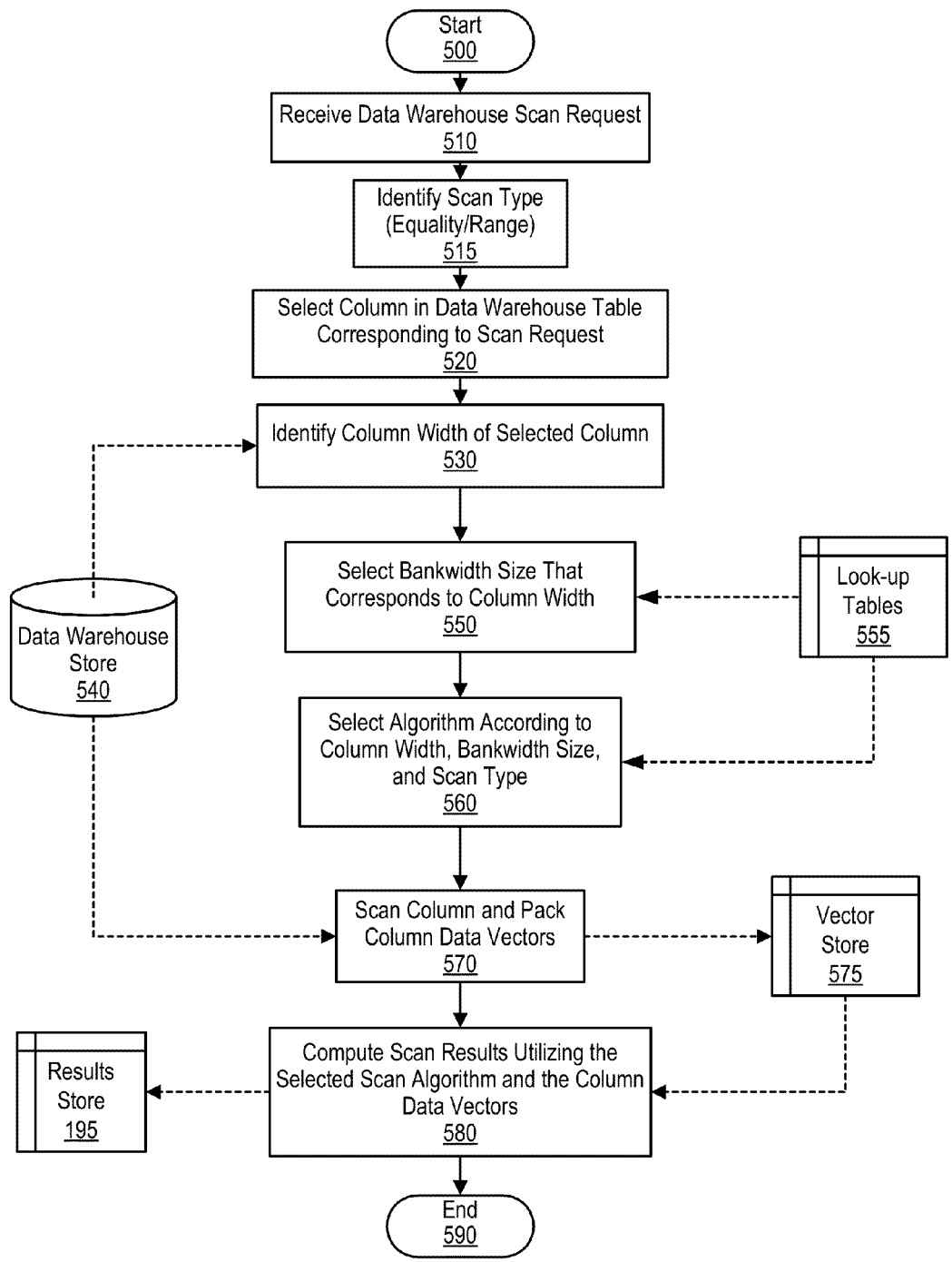
FIG. 5 is a flowchart showing steps taken in selecting an algorithm based upon various factors and utilizing the selected algorithm to compute scan results.
Figure 6A:
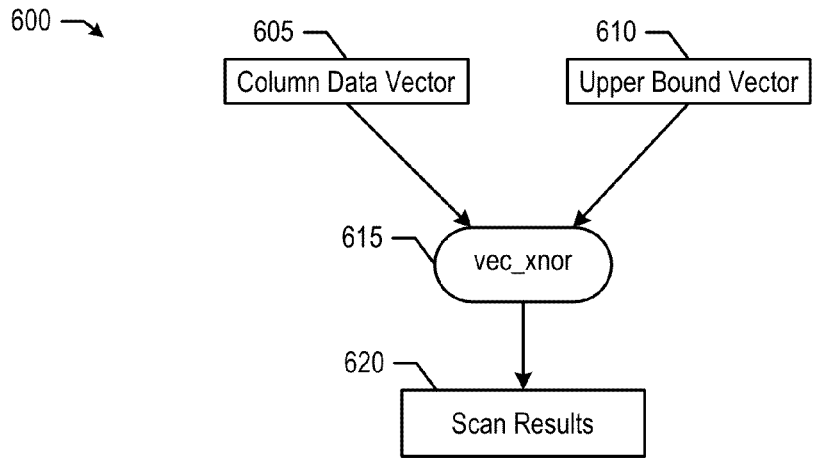
FIG. 6A shows an example of a scan algorithm's computations for a single bit column width range scan.
Figure 6B:
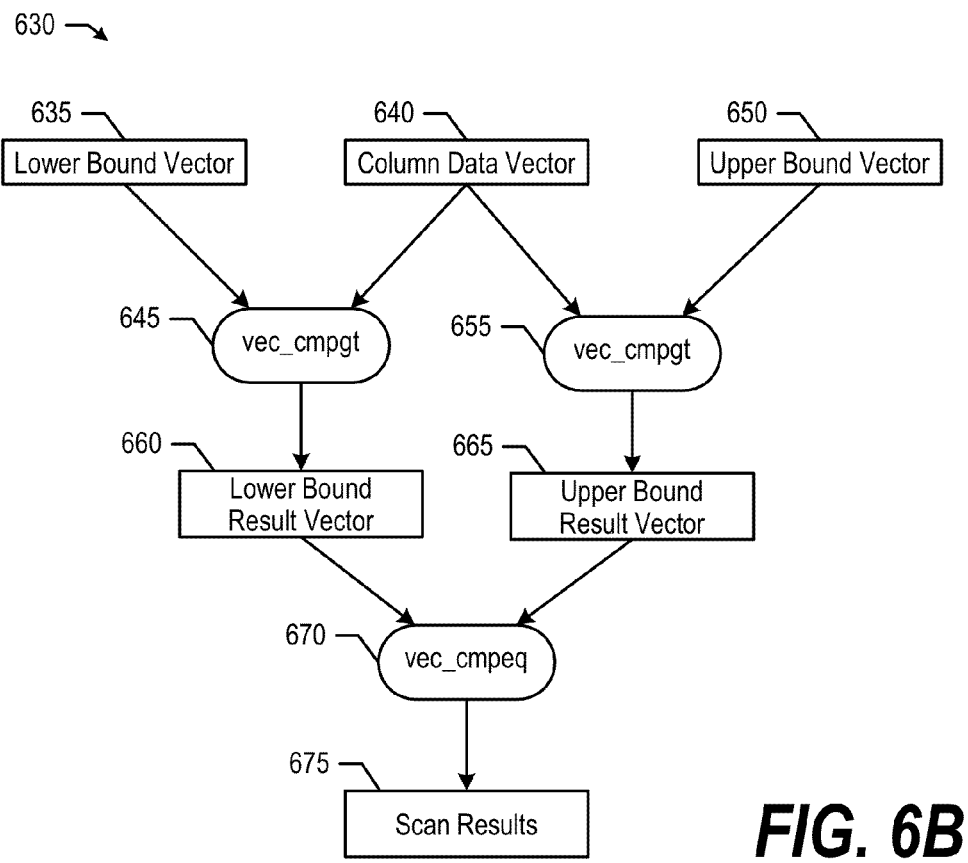
FIG. 6B shows an example of a scan algorithm's computations for an 8-bit multiple column width range scan.
Figure 7:
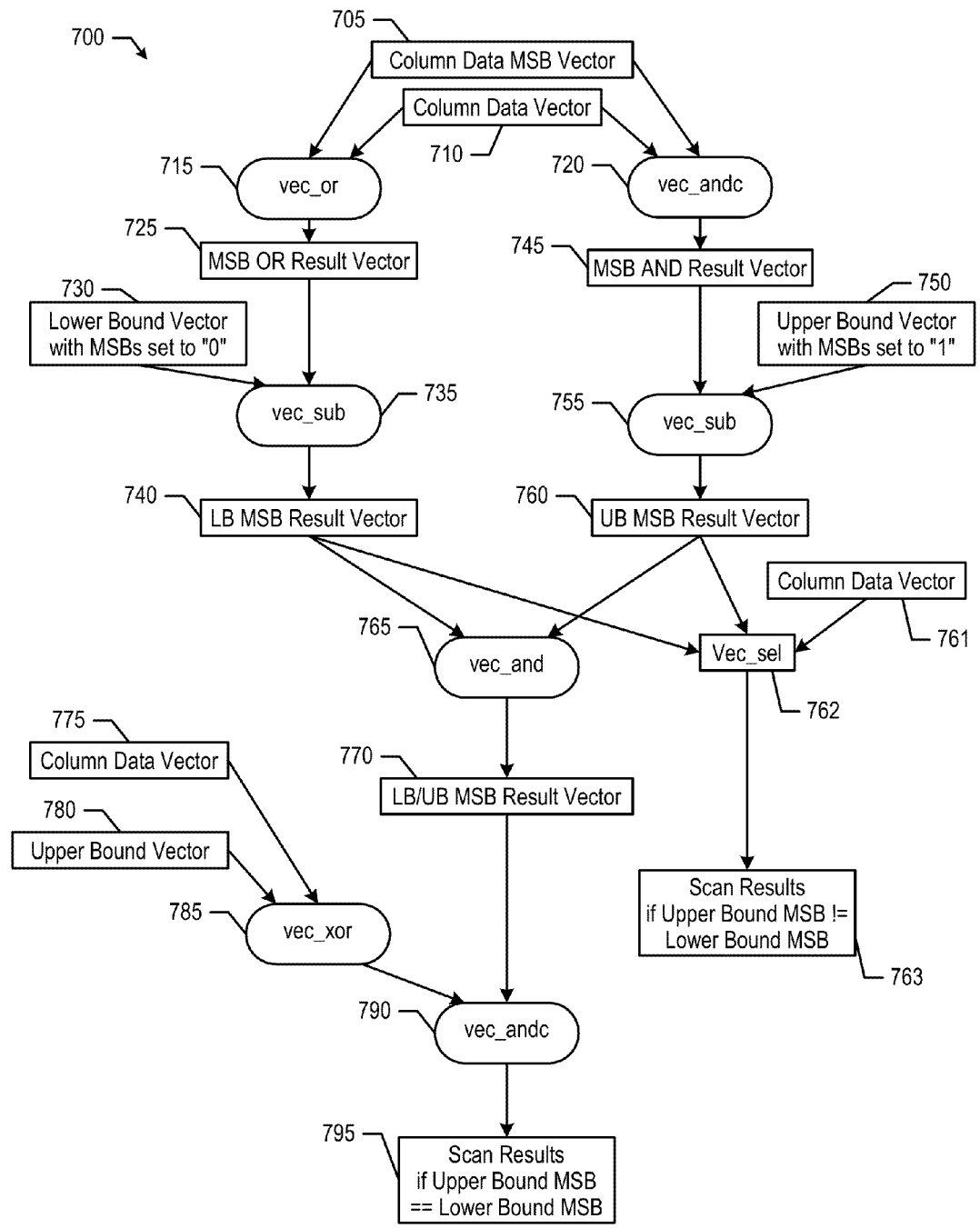
FIG. 7 shows an example of a scan algorithm's computations for a 2-bit or 4-bit column with range scans.

In turn, vector computation module 150 performs computations on column data vectors 145 according to the selected scan algorithm to generate scan results 185 that, in one embodiment, are stored in results store 195 (see FIGS. 5-7 and corresponding text for further details). Results store 195 may be stored in volatile or non-volatile memory, such as computer memory or a computer hard drive. As those skilled in the art can appreciate, functionality of data fetcher 140 and vector computation module may be partitioned differently than the example shown in FIG. 1.

Figure 2A:
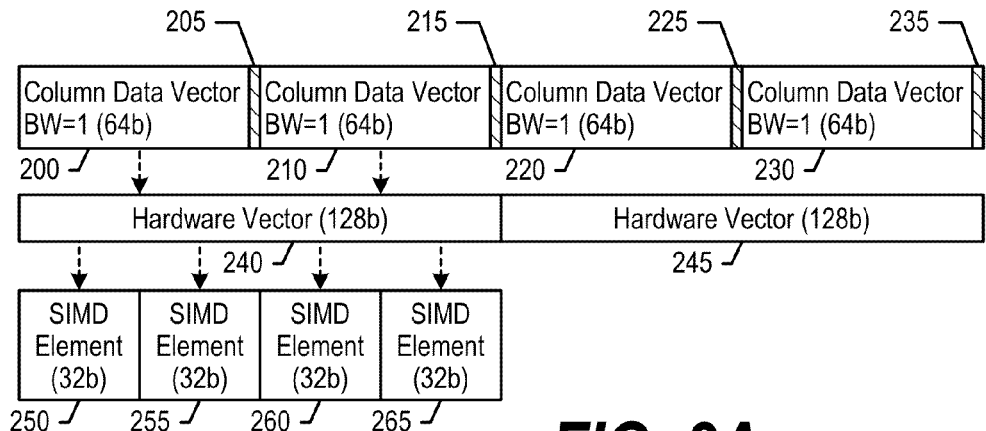
FIG. 2A is an example of column data vectors with a bankwidth size of 64 bits (bankwidth 1)
Figure 2B:
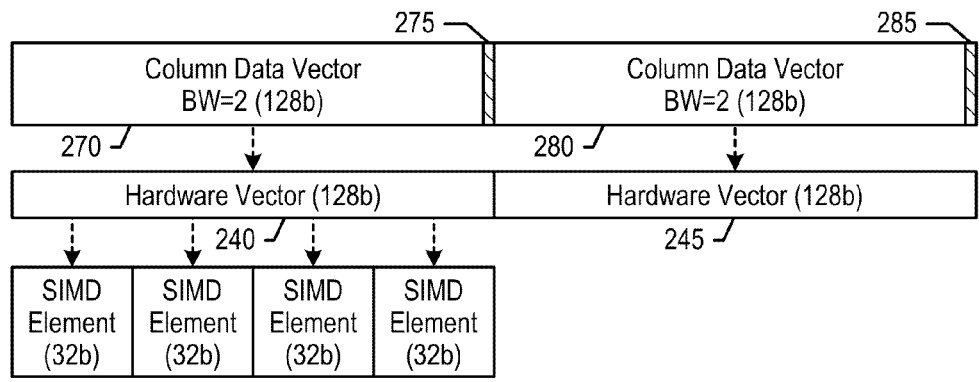
FIG. 2B is an example of column data vectors with a bankwidth size of 128 bits (bankwidth 2)
Figure 2C:
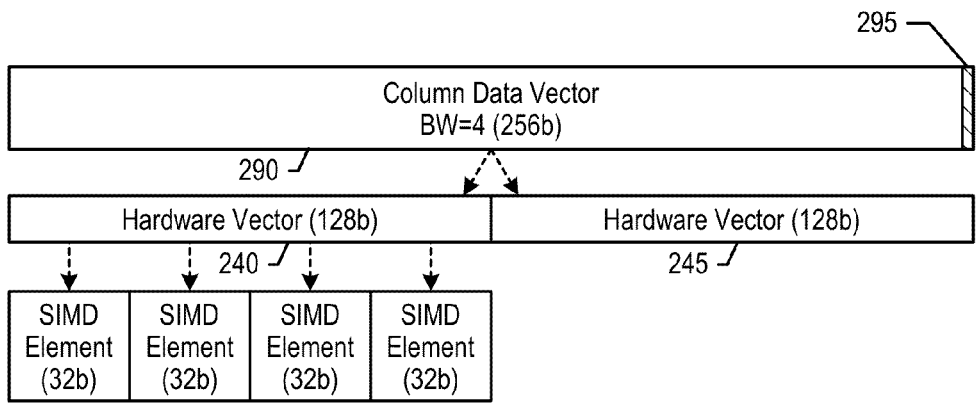
FIG. 2C is an example of a column data vector with a bankwidth size of 256 bits (bankwidth 4)

FIGS. 2A-2C are diagrams showing different bankwidth size selections and potential data padding areas filled with zeros based upon column widths. FIG. 2A is an example of column data vectors with a bankwidth size of 64 bits (bankwidth 1). Data fetcher 140 generates column data vectors 200, 210, 220, and 230 and, based upon the particular column width, may pad the column data vectors in areas 205, 215, 225, and/or 235. During computations, the column data vectors are loaded into hardware vectors 240 and 245, which are each 128 bits. In one embodiment, a processor may include one hardware vector, in which case hardware vector 240 represents a first load of the hardware vector and hardware vector 245 represents a second load of the hardware vector. The processor includes SIMD elements 250-265 that, in one embodiment, have a 32-bit SIMD element size. As such, during computations of hardware vector 240 (includes column data vectors 200-210), no data padding exists between SIMD element 250 and SIMD element 255. Thus, some column data entries may cross SIMD element boundaries.

FIG. 2B is an example of column data vectors with a bankwidth size of 128 bits (bankwidth 2). Data fetcher 140 generates column data vectors 270, 280 and, based upon the particular column width, may pad the column data vectors in areas 275 and/or 285. During computations, column data vectors 270 and 280 are loaded into hardware vectors 240 and 245, which are each 128 bits. In one embodiment, as discussed above, a processor may include one hardware vector in which case hardware vector 270 represents a first load of the hardware vector and hardware vector 280 represents a second load of the hardware vector. As can be seen, since the column data vector bankwidth size is the same as the hardware vector size in this example, column data entries will not cross hardware vector boundaries (although they may cross SIMD element boundaries as discussed in FIG. 2A).

FIG. 2C is an example of a column data vector with a bankwidth size of 256 bits (bankwidth 4). Data fetcher 140 generates column data vector 290 and may pad the column data in area 295 based upon the column width of the column data entries. During computations, column data vector 290 is loaded into hardware vectors 240 and 245, which are each 128 bits. In one embodiment, as discussed above, a processor may include one hardware vector in which case hardware vector 270 represents a first load of the hardware vector and hardware vector 280 represents a second load of the hardware vector. As can be seen, column data vector 290 does not include padding in the hardware vector boundary between hardware vectors 240 and 245. As such, a column data entry may cross the hardware vector boundary, which causes some of its data bits to be loaded on the first load and the rest of its data bits to be loaded on the second load (see FIG. 3B and corresponding text for further details).

Figure 3A:
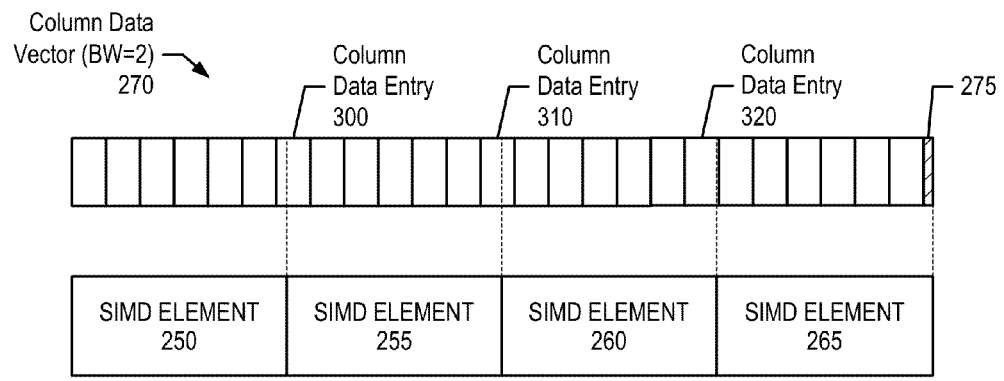
FIG. 3A is a diagram showing column data entries spanning across SIMD element boundaries.

FIG. 3A is a diagram showing column data entries spanning across SIMD element boundaries. Column data vector 270 has a bankwidth size of 128 bits and includes padding 275 at its end bit locations (depending on column width of column data entries). For example, assuming a column width of 5 bits, column data vector 270 loads 25 column data entries (bits 0-124) and pads the remaining bits 125-127.

FIG. 3A shows that data included in column data entry 300 crosses the SIMD element boundary between SIMD element 250 and SIMD element 255. Likewise, data included in column data entries 310 and 320 cross the SIMD element boundaries between SIMD elements 255/260 and SIMD elements 260/265, respectively. Since the disclosure described herein allows column data entries to cross SIMD element boundaries, more column data entries may be packed into a column data vector. As such, column data scan accelerator 135 is able to process more column data entries per column data vector.

Figure 3B:
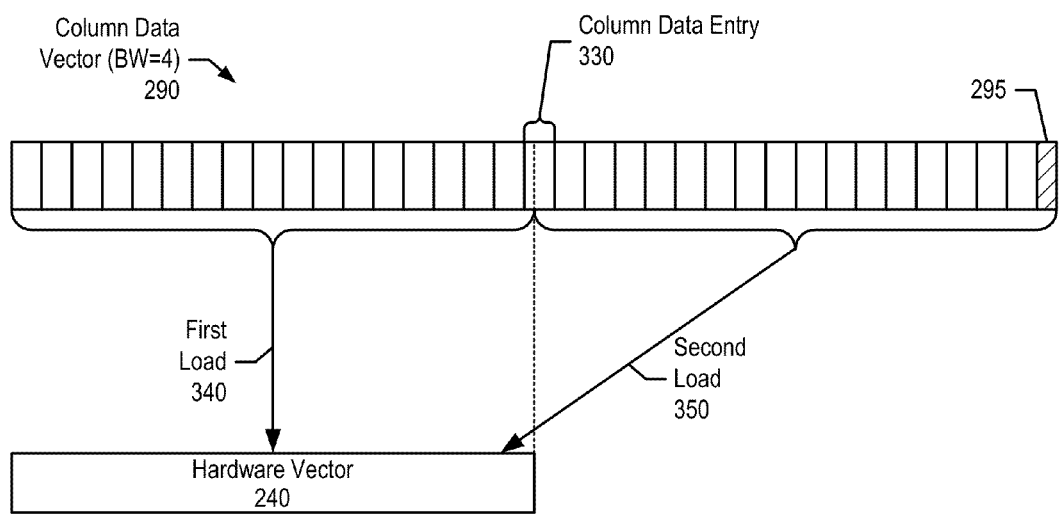
FIG. 3B is a diagram showing a column data entry crossing a hardware vector boundary.

FIG. 3B is a diagram showing a column data entry crossing a hardware vector boundary. Column data vector 290 has a bankwidth size of 256 bits and includes padding 295 at its end bit locations (depending on column width of column data entries). As can be seen, column data entry 330 crosses the hardware vector boundary, which causes a portion of its bits to load on first load 340 and a portion of its bits to load on second load 350.

In one embodiment, a processor may process more column data entries using a single column data vector with a 256 bit bankwidth size compared with two column data vectors with a 128 bit bankwidth size. Continuing with the example discussed above and assuming a column width of 5 bits, column data vector 290 packs 51 column data entries (bits 0-254) and pads the remaining bits 255-256. Compared with the above example of 25 column data entries per column data vector, the 256 bankwidth size column data vector allows one more column data entry to be processed (51 versus 50).

FIG. 4 is an exemplary scan algorithm selection table that includes the number of instructions for each of the different scan algorithms. Table 400 shows columns 410-435, which include selections for scan algorithms A-M and their corresponding number of instructions in parenthesis based upon the bankwidth size (bankwidths 1, 2, 4) and whether one or more column data entries cross a SIMD element boundary (32b and/or 64b). Column 405 includes a list of column widths for a selected column. For example, columns 410 and 415 show scan algorithms A-E to select when no SIMD element crossings occur. The scan algorithm to select depends upon whether the scan request is an equality type scan or a range type scan, and whether the column width is 1 bit (row 440), an 8-bit multiple (row 450), or 2/4 bits (row 460).

Columns 420 and 425 include a list of scan algorithms to select when the bankwidth size is 128 bits (bankwidth 2) and one or more SIMD element crossings occur. And, columns 430 and 435 include a list of scan algorithms to select when the bankwidth size is 256 bits (bankwidth 4) and one or more SIMD element crossings occur.

Table 400 assumes that each column data entry to be scanned has at most a single SIMD element crossing. If the column data entry width exceeds twice the SIMD element width, then multi SIMD element crossings may occur for a single data column entry. In this case, table 400 may have additional columns for covering the algorithm needed for the multi SIMD element crossing within a single data column case.

Table 400 shows that selecting a scan algorithm specific to the column width, SIMD element crossings, and scan type leads to a significant reduction of the number of instructions needed for commonly used column widths (e.g., 1 bit and 8-bit multiple bits). In the 1 bit column range scan case (row 440, column 415) no scanning is required as a range scan with "0"<=col<="1" will always pass independent of the column data bit value "col". This selection of the scan algorithms directly gives a large improvement for the scan run time of business analytics. Without this customization, each 128-bit column data vector would undergo the 15 instructions shown for scan algorithm I (row 470, column 425). Those skilled in the art can appreciate that the actual implementation of the different scan algorithms may differ for each processor implementation as the by the processor supported instruction set architecture as well as the supported hardware vector width sizes and SIMD element sizes may differ.

FIG. 5 is a flowchart showing steps taken in selecting an algorithm based upon various factors and utilizing the selected algorithm to compute scan results. Processing commences at 500, whereupon processing receives a scan request at step 510 that requests statistical information corresponding to particular data located in a data warehouse table. Processing identifies a scan type of the scan request at step 515. In one embodiment, the scan type may be an equality scan request (e.g., data that equals a value) or a range scan request (e.g., data that is within an upper bound and a lower bound range).

At step 520, processing selects the column corresponding to the scan request in the data warehouse table. For example, the scan request may request information pertaining to an age of members of a group. Next, processing identifies the column width of the selected column at step 530 (e.g., 2 bits, 8 bits, 9 bits, etc.).

At step 550, processing selects a bankwidth size based upon the identified column width. In one embodiment, processing accesses a table stored in look-up tables 555 to select the corresponding scan algorithm. In one embodiment, when the SIMD architecture supports a hardware vector width of 128b, then a 256b Bankwidth size may be selected when more column data entries fit into a 256b column data vector compared with the amount of column data entries that will fit into two 128b column data vectors. Using a 3-bit bankwidth size as an example, 85 column data entries will fit into a 256b bankwidth size column data vector (mod(256/3)=85 columns), but only 84 column data entries will fit into two 128b bankwidth size column data vectors.

Processing, at step 560, selects a scan algorithm based upon the column width, bankwidth size, and scan type. In one embodiment, processing utilizes a look-up table stored in look-up tables 555 to select the corresponding scan algorithm (see FIG. 4 and corresponding text for further details).

At step 570, processing loads column data entries from the selected column into one or more column data vectors and, in one embodiment, stores the column data vectors in vector store 575. In turn, processing computes scan results by the selected scan algorithm's instructions on the column data vectors stored in vector store 575. Processing stores the scan results in results store 195 and ends at 590.

FIG. 6A shows an example of a scan algorithm's computations for a single bit column width equality scan (e.g., FIG. 4, column 410, row 440). For the embodiment shown in FIG. 6A, the scan request is a equality scan with a predicate of "LB<=col<=UB" on a single bit column. With UB,LB=0 the predicate for equality scan will be "0<=col<=0" and for UB,LB=1 the predicate to scan for is "1<=col<=1". Diagram 600 shows column data vector 605, which includes the column data entries from the data table, and upper bound vector 610, which includes the upper bound (UB) values. Before the scan starts the UB bit is replicated according to the SIMD vector width and stored the Upper Bound Vector 610.

Instruction 615, which is a SIMD vector bitwise logical XNOR instruction, performs a vector XNOR computation and generates scan results 620 accordingly.

FIG. 6B shows an example of a LB<=Col<=UB (with UB>=LB) scan algorithm's computations for an 8-bit multiple column width range scan (8, 16, 32, 64, see FIG. 4, column 415, row 450). Diagram 630 includes lower bound vector 635, column data vector 640, and upper bound vector 650. Instruction 645 produces lower bound result vector 660 and instruction 655 produces upper bound result vector 665 for each 8-bit SIMD element matching the column width. Instruction 670 doing a compare on each 8-bit SIMD element takes vectors 660 and 665 as inputs and produces the scan results 675 for each 8-bit SIMD element. As those skilled in the art can appreciate, different instructions may be used to compute scan results 675 from column data vector 640.

FIG. 7 shows an example of a scan algorithm's computations for a 2-bit or 4-bit multi column width range scan (see FIG. 4, column 415, row 460). Before the scan starts, column data MSB vector 705 is constructed, which has all bits set to 1 that corresponds to the MSB bits in the column data vector and all other bits set to 0. In addition, Upper Bound Vector 780 (and Lower Bound Vector) is constructed by replicating the Upper Bound Data matching the data column width to fill the Bank Width with the number of Column Data fitting and padding at the end of the vector if needed. Finally, a SIMD ANDC performs a bitwise AND of the Lower Bound Vector and the bit wise complement of the Data MSB vector to compute vector 730. Vector 730 has all MSBs set to 0 in the lower bound vector. Likewise, a SIMD OR of the Upper Bound Vector and the Data MSB Vector computes vector 750. Vector 750 has all MSB bits set to 1 in the Upper Bound Vector. As such, the scanning operation has the required vectors completed that are constant input vectors during the operation.

Diagram 700 shows column data MSB vector 705 and column data vector 710 as inputs into instructions 715 and 720, which produce vectors 725 and 745 accordingly.

Lower bound vector with MSBs set to zero 730 and MSB OR result vector 725 are inputs to instruction 735, which produce LB MSB result vector 740. Likewise, upper bound vector with MSBs set to one 750 and MSB AND result vector 745 are inputs to instruction 755, which produce UB MSB result vector 760. Vectors 740 and 760 are inputs to instruction 765, thus producing LB/UB MSB result vector 770 which is input to instruction 790, which produces scan results 795 for the case the MSB bit of the Upper Bound equals the MSB bit of the Lower Bound. If the MSB bits of the Upper Bound and Lower Bound do not match, the scan result 763 is produced by a Vec_SEL instruction 762 from the inputs 740, 760 and the column data vector 761. The selection of the scan result 795 or 760 based on the MSB bit of the Upper Bound and Lower Bound is performed by an "if-then-else" instruction or by another vec_sel instruction. Seven instructions are needed to compute scan results 795 from column data vector 710 (e.g., table 400, row 460, column 415. Table 400 may be refined with more columns that differentiate between the Upper and Lower Bound MSB bit as a total of five instructions required to compute result 762 instead of the longest sequence of seven instructions. As those skilled in the art can appreciate, different instructions may be used to compute scan results 795 and 763 from column data vector 710 and table 400 may be extended with additional rows and columns for each case with performance advantages of using different instructions to compute the scan result.

In one embodiment, the range scan computation algorithm for the 3, 5, 7-bit other case (see FIG. 4, column 420, row 470) differs from diagram 700 in that the SIMD elements of data elements needs to be handled in addition.

Figure 8:
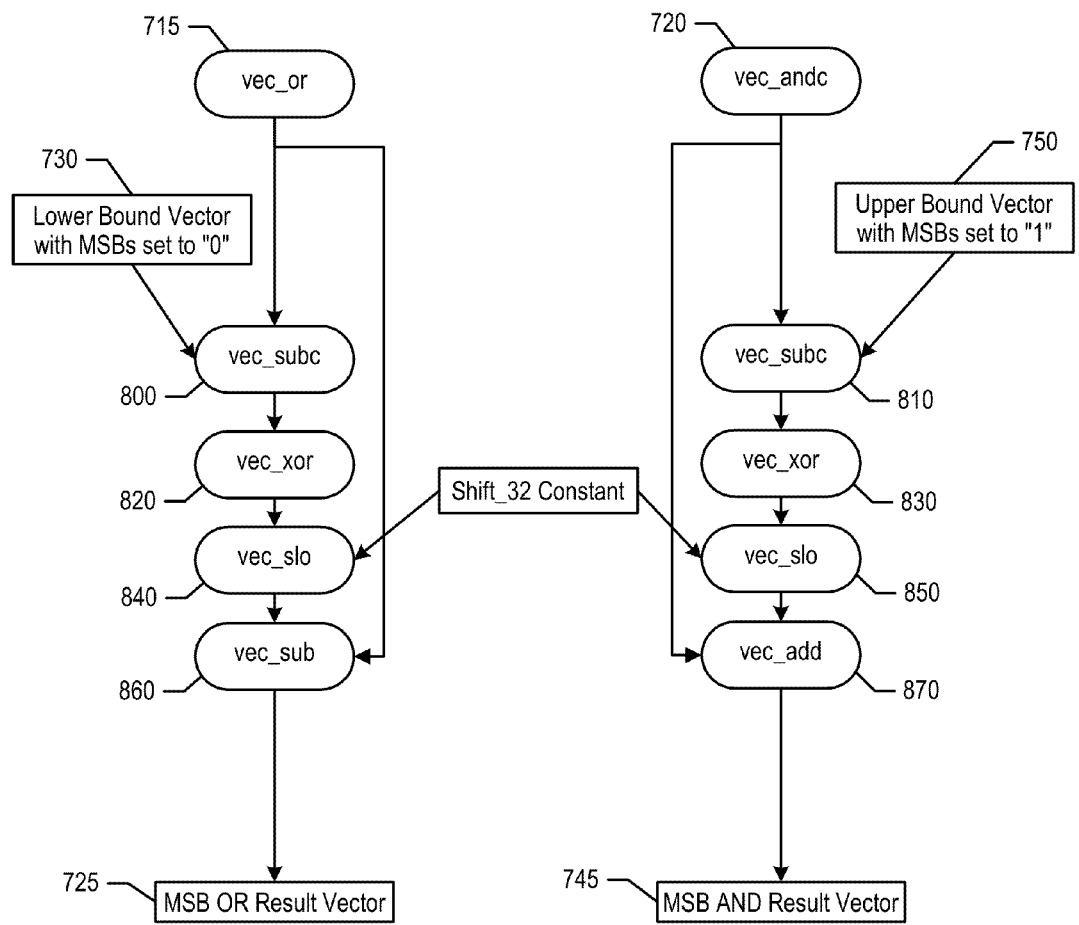
FIG. 8 shows an example of a scan algorithm's computation extensions for a 3-bit, 5-bit or 7 bit column with range scans.

FIG. 8 is a diagram showing the additional instructions handling a carry between the 32-bit wide SIMD elements for the column that are located across SIMD elements. Vec_subc instruction 800/810 sets a carry for each of the 32-bit wide SIMD elements. Next, vec_xor instruction 820/830 inverts the carry polarity and the result is shifted left 32-bit via vec_slo 840/850 to add/subtract the potential carry to rest of the column data, which is done by vec_add 870 and vec_sub 860 instruction forming MSB AND results vector 745 and MSB OR result vector 725. Now that the SIMD element crossings have been taken into account, MSB AND Result Vector 745 and MSB OR result Vector 725 can be further processed as in the case of no SIMD element crossing (FIG. 7). As those skilled in the art can appreciate, different instructions may be used, and that a 256-bit Bank width may require additional instructions for handling the carry between 128-bit hardware vectors as columns cross the hardware vectors in a 256-bit bankwidth.

Figure 9:
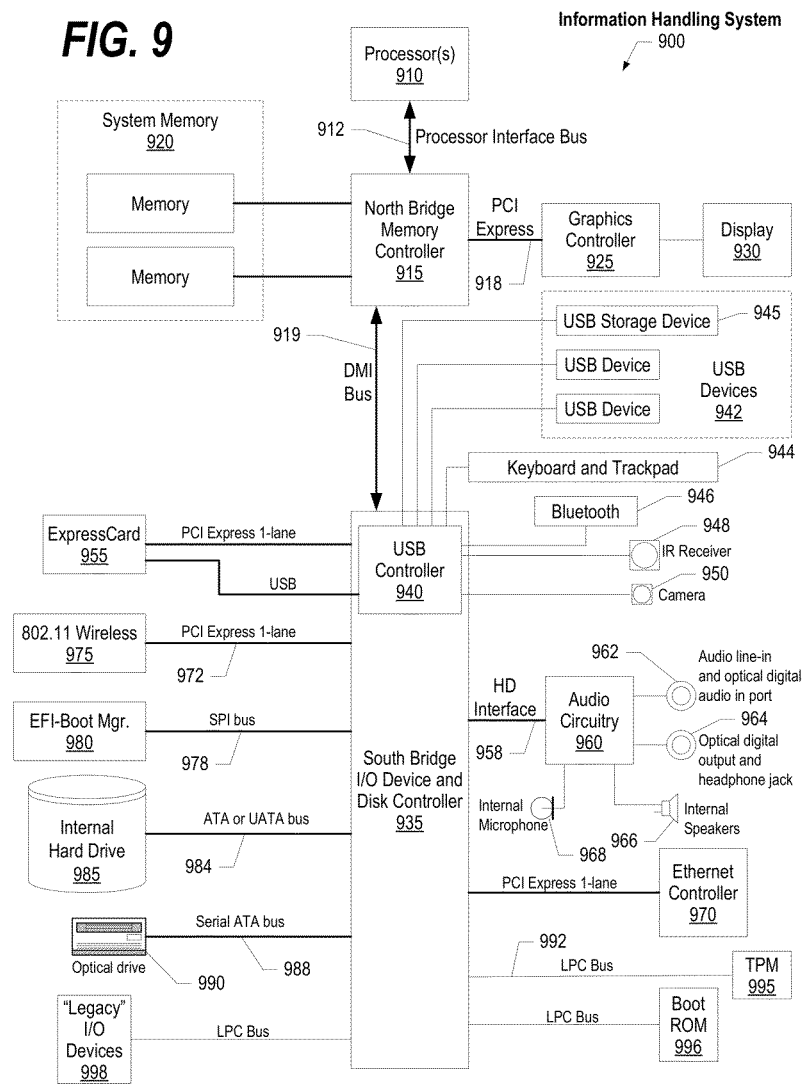
FIG. 9 is a block diagram of a data processing system in which the methods described herein can be implemented.

FIG. 9 illustrates information handling system 900, which is a simplified example of a computer system capable of performing the computing operations described herein. Information handling system 900 includes one or more processors 910 coupled to processor interface bus 912. Processor interface bus 912 connects processors 910 to Northbridge 915, which is also known as the Memory Controller Hub (MCH). Northbridge 915 connects to system memory 920 and provides a means for processor(s) 910 to access the system memory. Graphics controller 925 also connects to Northbridge 915. In one embodiment, PCI Express bus 918 connects Northbridge 915 to graphics controller 925. Graphics controller 925 connects to display device 930, such as a computer monitor.

Northbridge 915 and Southbridge 935 connect to each other using bus 919. In one embodiment, the bus is a Direct Media Interface (DMI) bus that transfers data at high speeds in each direction between Northbridge 915 and Southbridge 935. In another embodiment, a Peripheral Component Interconnect (PCI) bus connects the Northbridge and the Southbridge. Southbridge 935, also known as the I/O Controller Hub (ICH) is a chip that generally implements capabilities that operate at slower speeds than the capabilities provided by the Northbridge. Southbridge 935 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 996 and "legacy" I/O devices (using a "super I/O" chip). The "legacy" I/O devices (998) can include, for example, serial and parallel ports, keyboard, mouse, and/or a floppy disk controller. The LPC bus also connects Southbridge 935 to Trusted Platform Module (TPM) 995. Other components often included in Southbridge 935 include a Direct Memory Access (DMA) controller, a Programmable Interrupt Controller (PIC), and a storage device controller, which connects Southbridge 935 to nonvolatile storage device 985, such as a hard disk drive, using bus 984.

ExpressCard 955 is a slot that connects hot-pluggable devices to the information handling system. ExpressCard 955 supports both PCI Express and USB connectivity as it connects to Southbridge 935 using both the Universal Serial Bus (USB) the PCI Express bus. Southbridge 935 includes USB Controller 940 that provides USB connectivity to devices that connect to the USB. These devices include webcam (camera) 950, infrared (IR) receiver 948, keyboard and trackpad 944, and Bluetooth device 946, which provides for wireless personal area networks (PANs). USB Controller 940 also provides USB connectivity to other miscellaneous USB connected devices 942, such as a mouse, removable nonvolatile storage device 945, modems, network cards, ISDN connectors, fax, printers, USB hubs, and many other types of USB connected devices. While removable nonvolatile storage device 945 is shown as a USB-connected device, removable nonvolatile storage device 945 could be connected using a different interface, such as a Firewire interface, etcetera.

Wireless Local Area Network (LAN) device 975 connects to Southbridge 935 via the PCI or PCI Express bus 972. LAN device 975 typically implements one of the IEEE 802.11 standards of over-the-air modulation techniques that all use the same protocol to wireless communicate between information handling system 900 and another computer system or device. Optical storage device 990 connects to Southbridge 935 using Serial ATA (SATA) bus 988. Serial ATA adapters and devices communicate over a high-speed serial link. The Serial ATA bus also connects Southbridge 935 to other forms of storage devices, such as hard disk drives. Audio circuitry 960, such as a sound card, connects to Southbridge 935 via bus 958. Audio circuitry 960 also provides functionality such as audio line-in and optical digital audio in port 962, optical digital output and headphone jack 964, internal speakers 966, and internal microphone 968. Ethernet controller 970 connects to Southbridge 935 using a bus, such as the PCI or PCI Express bus. Ethernet controller 970 connects information handling system 900 to a computer network, such as a Local Area Network (LAN), the Internet, and other public and private computer networks.

While FIG. 9 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 995) shown in FIG. 9 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 10.

Figure 10:
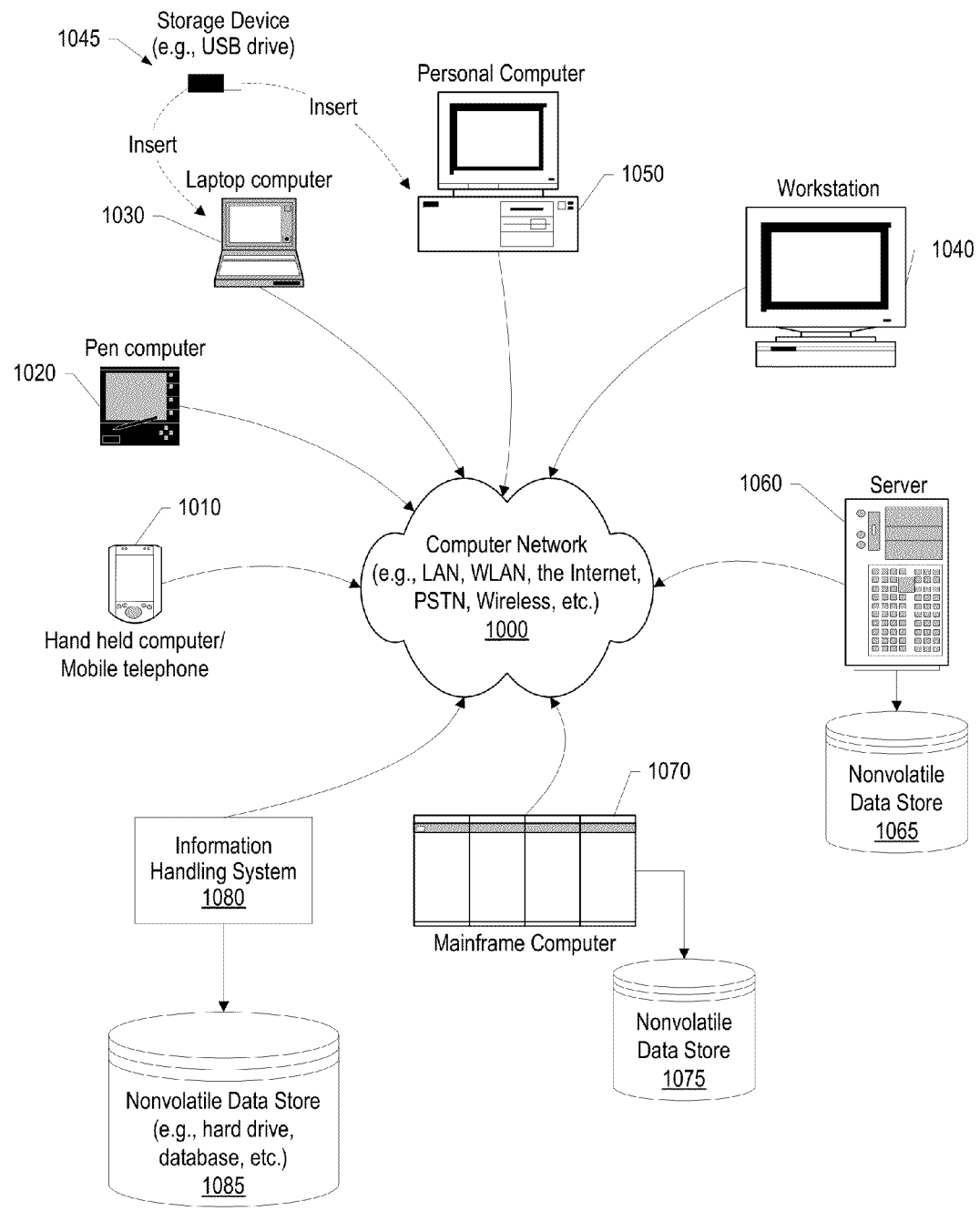
FIG. 10 provides an extension of the information handling system environment shown in FIG. 9 to illustrate that the methods described herein can be performed on a wide variety of information handling systems which operate in a networked environment.

FIG. 10 provides an extension of the information handling system environment shown in FIG. 9 to illustrate that the methods described herein can be performed on a wide variety of information handling systems that operate in a networked environment. Types of information handling systems range from small handheld devices, such as handheld computer/mobile telephone 1010 to large mainframe systems, such as mainframe computer 1070. Examples of handheld computer 1010 include personal digital assistants (PDAs), personal entertainment devices, such as MP3 players, portable televisions, and compact disc players. Other examples of information handling systems include pen, or tablet, computer 1020, laptop, or notebook, computer 1030, workstation 1040, personal computer system 1050, and server 1060. Other types of information handling systems that are not individually shown in FIG. 10 are represented by information handling system 1080. As shown, the various information handling systems can be networked together using computer network 1000. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 10 depicts separate nonvolatile data stores (server 1060 utilizes nonvolatile data store 1065, mainframe computer 1070 utilizes nonvolatile data store 1075, and information handling system 1080 utilizes nonvolatile data store 1085). The nonvolatile data store can be a component that is external to the various information handling systems or can be internal to one of the information handling systems. In addition, removable nonvolatile storage device 945 can be shared among two or more information handling systems using various techniques, such as connecting the removable nonvolatile storage device 945 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. An information handling system comprising:
one or more processors;
a memory coupled to at least one of the processors;
a set of computer program instructions stored in the memory and executed by at least one of the processors in order to perform actions of:
receiving, by one or more of the processors, a scan request corresponding to a data table, wherein the data table includes a plurality of columns;
selecting, by one of the processors, one of the plurality of columns that correspond to the scan request, wherein the selected column has a column width and includes a plurality of column data entries corresponding to the column width;
selecting a bankwidth size, from a plurality of bankwidth sizes, based upon the column width, wherein the bankwidth size identifies a number of bit locations of each one of the one or more column data vectors;
selecting, by one of the processors, a scan algorithm from a plurality of scan algorithms based upon the column width and the bankwidth size;
loading, by one of the processors, one or more of the plurality of column data entries into one or more column data vectors; and
computing, by one of the processors, one or more scan results using the selected scan algorithm and the one or more column data vectors.

2. The information handling system of claim 1 wherein the processors perform additional actions comprising:
identifying a scan type that corresponds to the scan request; and
utilizing the scan type, the bankwidth size, and the column width to select the scan algorithm.

3. The information handling system of claim 1 wherein:
one of the processors includes a plurality of SIMD elements;
the bankwidth size is larger than a SIMD element size corresponding to the plurality of SIMD elements; and
at least one of the column data entries included in the column data vector crosses an SIMD element boundary between two of the plurality of SIMD elements.

4. The information handling system of claim 1 wherein:
the bankwidth size is larger than a hardware vector size corresponding to a hardware vector included in one of the processors; and
at least one of the column data entries crosses a hardware vector boundary corresponding to the hardware vector wherein, in response to the hardware vector boundary crossing, a subset of bits included in the one of the column data entries loads into the hardware vector on a first load and a different subset of bits included in the one of the column data entries loads into the hardware vector on a second load.

5. The information handling system of claim 1 wherein the processors perform additional actions comprising:
calculating a predicate value for each of the loaded column data entries by applying the selected scan algorithm to the one or more column data vectors; and
setting a most significant bit of each of the loaded column data entries based upon its corresponding calculated predicate value.

6. The information handling system of claim 1 wherein the processors perform additional actions comprising:
calculating a predicate value for each of the loaded column data entries by applying the selected scan algorithm to the one or more column data vectors; and
using a plurality of SIMD instructions to set a most significant bit of each of the loaded column data entries based upon its corresponding calculated predicate value.

7. The information handling system of claim 1 wherein the processors perform additional actions comprising:
receiving a different scan request corresponding to the data table;
selecting a different one of the plurality of columns that correspond to the different scan request, wherein the selecting of the different column includes identifying a different column width of the selected different column; and
selecting a different scan algorithm from the plurality of scan algorithms based upon the different column width, wherein the different scan algorithm includes one or more different instructions than the scan algorithm.

8. A computer program product stored in a computer readable storage medium, comprising computer program code that, when executed by an information handling system, causes the information handling system to perform actions comprising:
receiving, by one or more processors, a scan request corresponding to a data table, wherein the data table includes a plurality of columns;
selecting, by one of the processors, one of the plurality of columns that correspond to the scan request, wherein the selected column has a column width and includes a plurality of column data entries corresponding to the column width;
selecting a bankwidth size, from a plurality of bankwidth sizes, based upon the column width, wherein the bankwidth size identifies a number of bit locations of each one of the one or more column data vectors;
selecting, by one of the processors, a scan algorithm from a plurality of scan algorithms based upon the column width and the bankwidth size;
loading, by one of the processors, one or more of the plurality of column data entries into one or more column data vectors; and computing, by one of the processors, one or more scan results using the selected scan algorithm and the one or more column data vectors.

9. The computer program product of claim 8 wherein the information handling system performs further actions comprising:
   identifying a scan type that corresponds to the scan request; and
   utilizing the scan type, the bankwidth size, and the column width to select the scan algorithm.

10. The computer program product of claim 8 wherein:
   one of the processors includes a plurality of SIMD elements;
   the bankwidth size is larger than a SIMD element size corresponding to the plurality of SIMD elements; and
   at least one of the column data entries included in the column data vector crosses an SIMD element boundary between two of the plurality of SIMD elements.

11. The computer program product of claim 8 wherein:
   the bankwidth size is larger than a hardware vector size corresponding to a hardware vector included in one of the processors; and
   at least one of the column data entries crosses a hardware vector boundary corresponding to the hardware vector wherein, in response to the hardware vector boundary crossing, a subset of bits included in the one of the column data entries loads into the hardware vector on a first load and a different subset of bits included in the one of the column data entries loads into the hardware vector on a second load.

12. The computer program product of claim 8 wherein the information handling system performs further actions comprising:
   calculating a predicate value for each of the loaded column data entries by applying the selected scan algorithm to the one or more column data vectors; and
   setting a most significant bit of each of the loaded column data entries based upon its corresponding calculated predicate value.

13. The computer program product of claim 8 wherein the information handling system performs further actions comprising:
   calculating a predicate value for each of the loaded column data entries by applying the selected scan algorithm to the one or more column data vectors; and
   using a plurality of SIMD instructions to set a most significant bit of each of the loaded column data entries based upon its corresponding calculated predicate value.

* * * * *